Jan. 14, 1969  T. T. HIGGINSON  3,421,729
TARGET MOULD
Filed Feb. 18, 1966

INVENTOR
Thomas T. Higginson
By
Ralph B Burch
ATTORNEY

United States Patent Office 3,421,729
Patented Jan. 14, 1969

3,421,729
TARGET MOULD
Thomas Tweed Higginson, P.O. Box 250,
Hawkesbury, Ontario, Canada
Filed Feb. 18, 1966, Ser. No. 528,585
U.S. Cl. 249—52                                1 Claim
Int. Cl. B28b 7/16

ABSTRACT OF THE DISCLOSURE

A mould for producing flying targets used in trap and skeet shooting comprising a ring shaped body having inner and outer walls provided with stepped upper portions to provide internal and external flanges formed integral with the target to increase its stability in flight.

This invention relates to trap and skeet targets and more particularly to a mould for the production of "clay birds" for target practice.

Broadly the invention comprises a hollow ring shaped mould to be filled by users with various substances such as a pitch or other cement bonding compound mixed with a suitable inert filler material, or water for freezing into ice.

Peripheral serrations are formed in alternate spaced apart relation to each other on the interior and exterior of the target surfaces to provide increased breaking facilities after the composition poured therein has solidified and the clay bird is ready for use.

The mould is formed with an inner flange which is filled with the filler mix. This flange will provide a planing surface for greater stability of flight and a greater travelling distance.

Clay birds or clay pigeons as they are commonly referred to are well known and used in the art of target practice, but are somewhat expensive to purchase. It is with this in mind that I have devised the present invention.

The primary object of the invention is therefore the provision of a mould for the production of trap and skeet targets which will enable users of such targets of producing their own with the composition of their choice to greatly reduce the cost of such targets.

Another important object of the invention is that users can fill the mould with water to form ice "clay birds" by placing the water filled moulds in a freezing compartment of an electric refrigerator, or by placing the moulds out of doors when the air temperature is below the freezing point of water.

Still another important object is the provision of a internal flange integrally formed with the bird to provide a planing surface for greater stability of flight and greater travelling distance.

Other apparent objects are the provision of a device of the character set forth which is easy to fill, light to transport, requires very little storage space and comparatively inexpensive to produce.

With these and other objects in view that may appear as the description proceeds, the invention consists in the novel arrangement of the mould as hereinafter more specifically set forth, claimed and shown in the accompanying drawing forming part of this application and in which:

Figure 1:
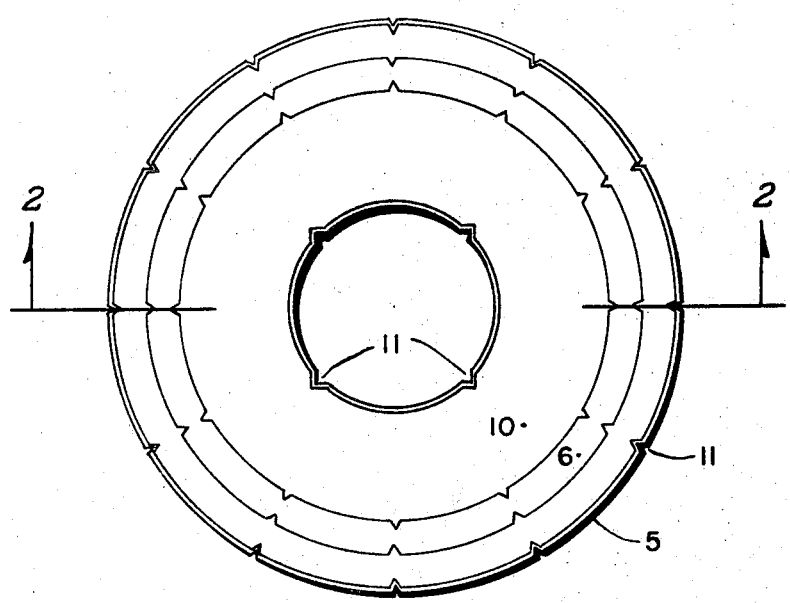
FIGURE 1 is a plan view of a mould constructed in accordance with the present invention.
Figure 2:
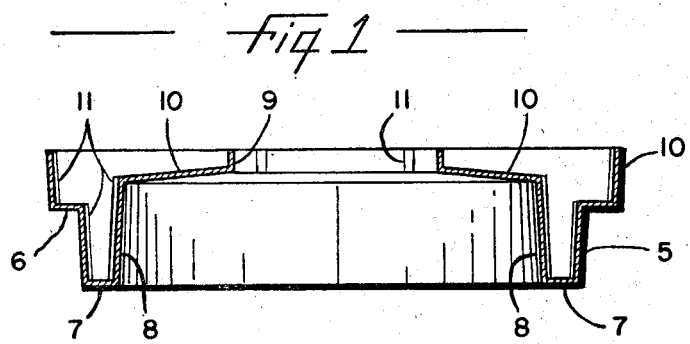
FIGURE 2 is an elevational sectional view taken along line 2—2 of FIGURE 1.

Referring more in detail to the drawing in which similar reference characters designate corresponding parts throughout both views, it will be seen the invention comprises a ring shaped mould formed with a slightly tapered stepped outer wall 5, the stepped portion being in a horizontal plane, a bottom wall 7 in parallel relation to the stepped portion 6 and an inner inwardly inclined wall 8. The upper portion of the inner wall 8 is flanged at the top extremity 9 while the floor or bottom wall 10 of the flange is formed at a slight angle to the horizontal plane. Both, the inner and the outer walls are formed with a plurality of staggered spaced apart serrations 11 to facilitate the breakage of the target in actual use.

It is intended to offer the customer a choice of moulds, the first would be of a substantial construction of a plastic or other type of material into which the customer could pour the mix, and on solidifying the target would be removed from the mould.

Alternately the mould could be made with a thin wall of fragile material to which the filler material would adhere, the mould itself remaining as an integral part of the actual finished target.

It is believed that the construction and advantages have been fully set forth and that further detailed description is not required.

While the preferred embodiment has been disclosed, it is to be understood that minor modifications may be resorted to without departing from the spirit of the invention and the scope of the claim.

The embodiments of the invention in which an exclusive property or privilege is claimed are defined as follows.

I claim:

1. A mould for producing flying targets used in skeet and trap shooting comprising a ring shaped body having inner and outer walls, the inner wall being inclined inwardly with its upper portion stepped inwardly and terminating in an upturned flange and the outer wall being inclined outwardly with its upper portion stepped outwardly, and a bottom wall connecting the lower edges of the inner and outer walls, said inner and outer walls being formed with a series of spaced apart serrations on their inner sides.

References Cited

UNITED STATES PATENTS

| 313,583 | 3/1885 | Fancy | 249—52 XR |
| 595,738 | 12/1897 | Sherman | 273—105.4 |
| 943,093 | 12/1909 | Mueller | 249—52 |
| 2,650,829 | 9/1953 | Jordan | 273—105.4 |
| 2,802,411 | 8/1957 | Riener | 249—117 |

WILLIAM J. STEPHENSON, Primary Examiner.

U.S. Cl. X.R.

25—118.5; 249—117; 273—105